United States Patent [19]

Geiger

[11] 4,050,146
[45] Sept. 27, 1977

[54] SPINDLEHEAD WITH TOOL-CHANGING DEVICE

[75] Inventor: Michael Geiger, Munich, Germany

[73] Assignee: Friedrich Deckel Aktiengesellschaft, Munich, Germany

[21] Appl. No.: 685,112

[22] Filed: May 10, 1976

[30] Foreign Application Priority Data

June 6, 1975 Germany .............................. 2525364

[51] Int. Cl.² .......................................... B23Q 3/157
[52] U.S. Cl. ..................................................... 29/568
[58] Field of Search ................................ 29/568, 26 A

[56] References Cited

U.S. PATENT DOCUMENTS

| 3,286,595 | 11/1966 | Wollenhaupt | 29/568 |
| 3,524,248 | 8/1970 | Durr et al. | 29/568 |

Primary Examiner—Othell M. Simpson
Assistant Examiner—Z. R. Bilinsky
Attorney, Agent, or Firm—Blanchard, Flynn, Thiel, Boutell & Tanis

[57] ABSTRACT

A multiple-spindle unit capable of being mounted onto an otherwise standard spindlehead in a tool machine. The multiple-spindle unit is driven by the spindle of the tool machine. A changing arm is utilized for connecting the drive member for the multiple-spindle unit to the spindle of the tool machine and thereafter the multiple-spindle unit is mounted on the spindlehead.

2 Claims, 3 Drawing Figures

SPINDLEHEAD WITH TOOL-CHANGING DEVICE

FIELD OF THE INVENTION

The invention relates to a spindlehead for a tool machine movable in at least one axial direction, comprising a tool-changing device movable with the spindlehead and having a changing arm pivotal in front of the spindle and can be moved in the direction of the spindle axis for inserting the tool into the spindle and for removing the tool from the spindle.

BACKGROUND OF THE INVENTION

A changing arm is generally constructed two-armed. During the changing operation, one arm grips the side of the tool and removes the tool from the spindle while the other arm simultaneously removes the new tool from the tool store. The changing arm thereafter swings so that the new tool is placed in front of the spindle and the used tool placed in front of the store. By moving the changing arm in direction of the spindle axis, the new tool is inserted into the spindle and the used tool inserted in the tool store. The changing arm then releases the inserted tool, however, remains in a position which is in front of the spindle so that the next tool change can take place without delay.

The advantage of the described arrangement with a tool-changing device which can be moved with the spindlehead is that the tool changing operation can take place directly after each operation without requiring the spindlehead to be brought into a changing position which lies opposite the stationary store.

An important disadvantage of this arrangement is, however, that the tool-changing device, in particular the changing arm remains in front of the spindle after the changing operation and prevents receiving a multiple-spindle unit which is driven by the spindle, so that spindleheads having a tool-changing device of the described kind could not up to now be constructed to receive multiple-spindle units and thus strongly limit the universality of the entire machine.

The purpose of the present invention is to improve a spindlehead having a tool-changing device in such a manner that it can be used universally and that in particular multiple-spindle units can be used.

This purpose is inventively attained by the spindlehead being adapted to accommodate a multiple-spindle unit which can be driven by the spindle, whereby said multiple-spindle unit has a recess into which recess the changing arm projects when the multiple-spindle unit is mounted on the spindlehead.

The changing arm, which is not used to accommodate the spindlehead to the multiple-spindle unit, may maintain its position in front of the spindle. Through this, it is possible to include the multiple-spindle unit just as would be various individual tools into the work sequence.

The multiple-spindle unit is added to the spindlehead and is driven centrally by the tool spindle. For this purpose, it is provided according to one characteristic of the invention that for driving the multiple-spindle unit there is provided a driving sleeve which can be inserted by the changing arm into the spindle, whereby a recess in the multiple-spindle unit has a corresponding size which offers space for the driving sleeve and the changing arm.

The change from a conventional tool to the multiple-spindle unit occurs then as follows:

The tool is removed from the spindle by the changing arm and is replaced by the driving sleeve which is stored in the tool store, which driving sleeve is just like the tools chucked in the spindle. The multiple-spindle unit is then added to the spindlehead, whereby the possibility exists that the spindlehead receives automatically the multiple-spindle unit from a storage place.

The multiple-spindle unit is secured on the spindlehead according to the characteristic of the invention by several locking rods which can be extended in direction of the spindle axis and can be locked in the multiple-spindle unit.

BRIEF DESCRIPTION OF THE DRAWINGS

One exemplary embodiment of the invention is illustrated in the drawings and described more in detail hereinbelow.

In the drawings.

DETAILED DESCRIPTION

Figure 1:
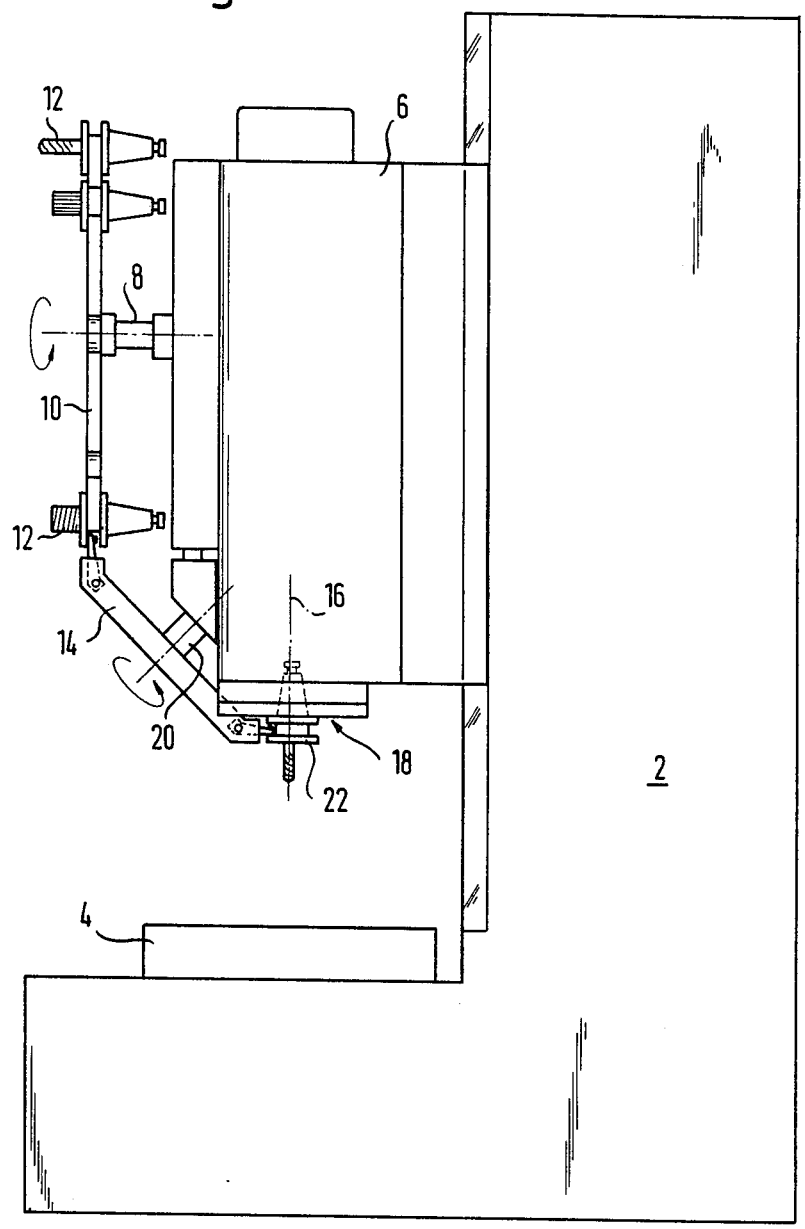
FIG. 1 illustrates a milling and boring machine with a spindlehead which can be moved in vertical direction and a tool-changing device which can be driven with the spindle-head.

The boring and milling machine which is illustrated in FIG. 1 consists substantially of a column 2 with a table 4 and a spindlehead 6 which is driven in a vertical direction on the column 2. A disk-shaped tool store or magazine 10 having several tools 12 inserted in clamping sleeves thereon are rotatably supported about a horizontal axis 8 on the spindle-head. A two-arm constructed changing arm 14 is used to exchange the tools. The changing arm is rotatably supported about an axis of rotation 20 which is inclined to the axis 8 of the tool store and the axis 16 of the tool spindle 18 and is supported as a whole movably in direction of the axis 16.

To change the tool, one arm side grips the tool 22 which is in the spindle, the other opposite arm side grips a tool 12 which is stored in the tool store 10. The entire changing arm 14 is then moved downwardly in the direction of the spindle axis 16 so that the tools are released from their mountings. The changing arm 14 is subsequently rotated 180° about the axis 20 and is again moved upwardly.

After insertion of the new tool into the spindle 18, the changing arm 14 releases this tool, however, remains in its position in front of the spindle, so that the next change can take place without any delay.

Figure 2:
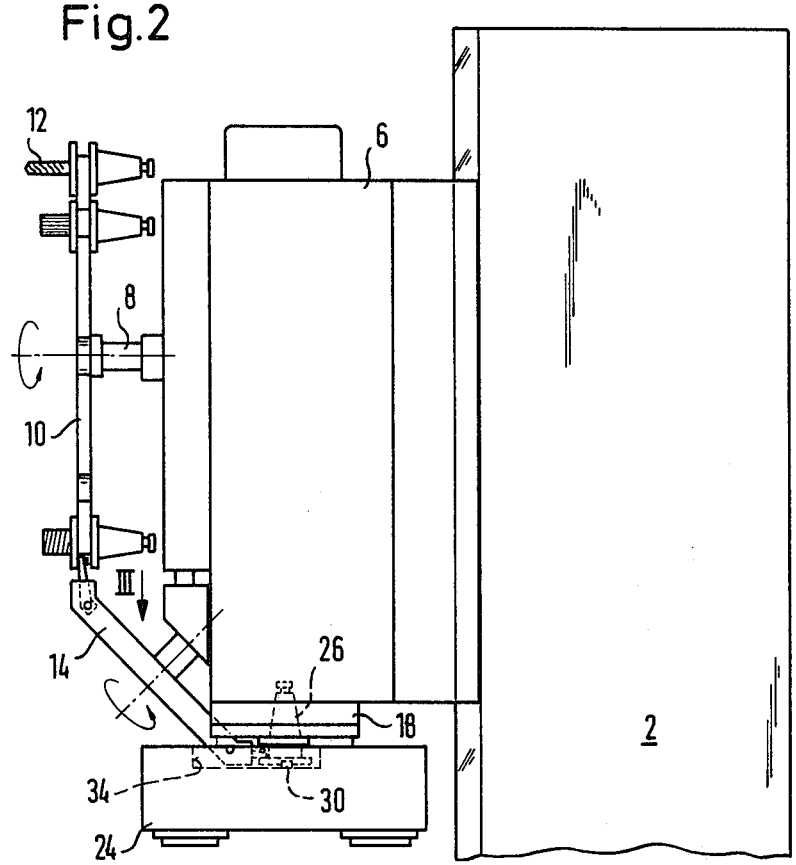
FIG. 2 illustrates a spindlehead according to FIG. 1 with an added multiple-spindle unit.

FIG. 2 illustrates the spindlehead 6 with an added multiple-spindle unit 24. For this purpose, the changing arm 14 has inserted a driving sleeve 26 into the spindle 18, which driving sleeve is formed exactly like a tool shank and can be chucked like same. After insertion of the driving sleeve into the spindle 18, the driving sleeve 26 is released by the changing arm 14 in a conventional manner, that is, a lock necessary for the changing operation is released. The changing arm 14 itself, however, maintains its position in front of the spindle 18.

The multiple-spindle unit 24 is thereafter affixed to the spindlehead 6 and fixedly connected thereto.

Figure 3:
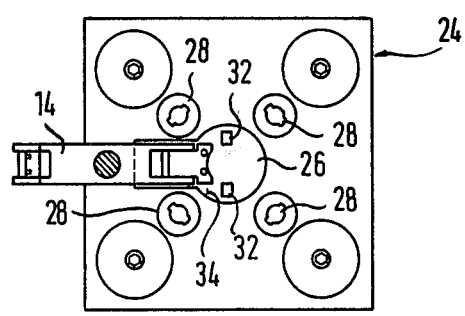
FIG. 3 illustrates a multiple-spindle unit according to FIG. 2 in a view corresponding with the arrow III in FIG. 2.

As is particularly shown in FIG. 3, the multiple-spindle unit 24 has four openings 28, into which can engage locking rods which are actually known and are therefore not illustrated in detail.

The driving sleeve 26 is equipped with driving teeth 30, which engage corresponding recesses 32 in a center input shaft of the multiple-spindle unit 24.

As can particularly be taken from FIGS. 2 and 3, the multiple-spindle unit 24 has a recess 34 in its surface which faces the spindlehead 6. The part of the changing arm 14 which is positioned in front of the spindle 18 projects into the recess 34. The recess 34 is sufficiently large to accomodate the driving sleeve 26.

Of course, a construction is also conceivable, in which the driving sleeve 26 forms one integrated structural part with the multiple-spindle unit, so that in this case the recess 34 must only have a size which is sufficient for receiving the changing arm 14.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a spindlehead for a tool machine which is movable in at least one axial direction and has at least one spindle, comprising tool-changing means mounted on and movable with said spindlehead and includes a tool magazine and a changing arm which can be pivoted in front of said spindle and support means for supporting said changing arm for movement in a direction parallel to the spindle axis for effecting an insertion of a tool directly into said spindle and for removing said tool from said spindle and, simultaneously therewith, the removal of a tool from said tool magazine and a placement of said tool in said tool magazine, respectively, the improvement comprising wherein said tool magazine includes driving sleeve means receivable in said spindle, said changing arm being adapted to remove said driving sleeve means from said tool magazine and insert same into said spindle and wherein said spindlehead includes means for receiving a multiple-spindle unit which can be driven by said driving sleeve means mounted on said spindle, said multiple-spindle unit having a recess therein for receiving said changing arm when the multiple-spindle unit is mounted on said spindlehead.

2. The improved spindlehead according to claim 1, wherein for securing the multiple-spindle unit on the spindlehead several locking rods are provided which can be extended in direction of the spindle axis and can be locked in the multiple-spindle unit.

* * * * *